(12) United States Patent
Brooks et al.

(10) Patent No.: US 9,083,462 B2
(45) Date of Patent: Jul. 14, 2015

(54) OPTICAL COMMUNICATIONS SYSTEM

(71) Applicant: Loki Systems LLC, Vancouver, WA (US)

(72) Inventors: William M. Brooks, Scotts Valley, CA (US); Frederick N. Magee, Vancouver, WA (US)

(73) Assignee: Loki Systems LLC, Vancouver, WA (US)

(*) Notice: Subject to any disclaimer, the term of this patent is extended or adjusted under 35 U.S.C. 154(b) by 13 days.

(21) Appl. No.: 14/189,128

(22) Filed: Feb. 25, 2014

(65) Prior Publication Data
US 2014/0241729 A1 Aug. 28, 2014

Related U.S. Application Data

(60) Provisional application No. 61/768,732, filed on Feb. 25, 2013.

(51) Int. Cl.
H04B 10/04 (2006.01)
H04B 10/2575 (2013.01)
H04B 10/112 (2013.01)
H04B 10/00 (2013.01)

(52) U.S. Cl.
CPC ........ *H04B 10/2575* (2013.01); *H04B 10/1121* (2013.01)

(58) Field of Classification Search
CPC .................... H04B 10/2575; H04B 10/532
See application file for complete search history.

(56) References Cited

U.S. PATENT DOCUMENTS

| 4,757,472 A | 7/1988 | Magee et al. |
| 5,146,358 A | 9/1992 | Brooks |
| 2006/0114948 A1* | 6/2006 | Lo et al. .......................... 372/23 |
| 2007/0279637 A1* | 12/2007 | Hill .................................. 356/486 |

* cited by examiner

*Primary Examiner* — Daniel Dobson
(74) *Attorney, Agent, or Firm* — Davis Wright Tremaine LLP; George C. Rondeau, Jr.

(57) ABSTRACT

An optical communications system is disclosed. In the optical communications system, a received light source is modulated in accordance with an electrical signal using an acousto-optic modulator. The acousto-optic modulator modulates an amplitude of the received light source in accordance with an amplitude of the electrical signal. Furthermore, an angle of diffraction of a beam produced by the acousto-optic modulator is a function of a frequency of the electrical signal. The optical communications system is equipped with a waveplate that converts a polarization of the diffracted beam to correspond to the polarization of an undiffracted beam. Improved detection and recovery of the electrical signal may be achieved due to the polarization correspondence between the diffracted beam and the undiffracted beam.

20 Claims, 2 Drawing Sheets

OPTICAL COMMUNICATIONS SYSTEM

CROSS REFERENCE TO RELATED APPLICATION(S)

Figure 1:
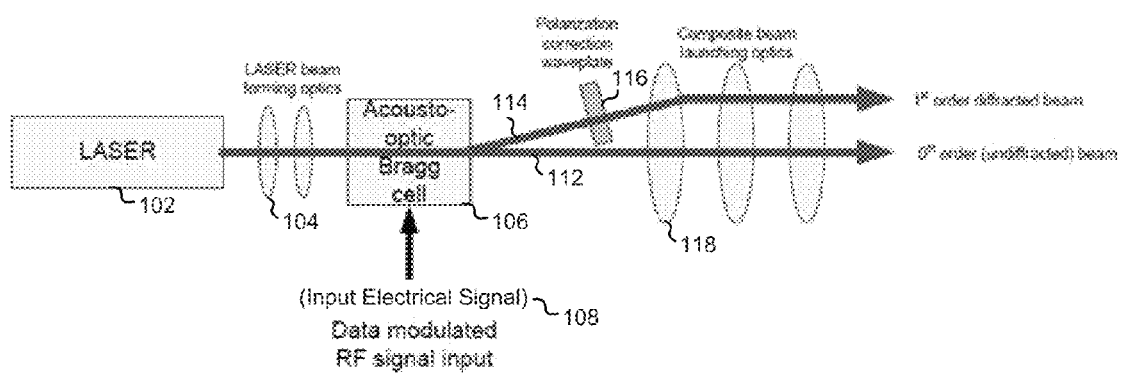

This application claims the benefit of U.S. Provisional Patent Application No. 61/768,732 filed on Feb. 25, 2013, the contents of which are hereby incorporated by reference herein as if fully set forth.

BACKGROUND OF THE INVENTION

1. Field of the Invention

The present invention is directed generally to an improved optical communications system that utilizes an acousto-optic modulator device as a signal transmitting transducer for electrical signals carrying information and, more particularly, to an optical beam that has been modulated by an acousto-optic modulator that can be detected by a photodetector and appropriate electrical transducer circuits to demodulate the optical beam and recover the original electrical information.

2. Description of the Related Art

U.S. Pat. No. 5,146,358 describes an architecture of optical and electrical components that constitute an optical communication system.

U.S. Pat. No. 5,146,358 further describes that diffracted optical beams in conjunction with a remaining or undiffracted optical beam may be spatially recombined by an optical lens to create a single composite optical beam that can propagate through free space or an optical waveguide, directly to a photodetector that performs the optical demodulation function to recover the original electrical signal.

U.S. Pat. No. 5,146,358 further describes the manner in which a diffracted portion of the optical beam experiences modulation of optical amplitude and frequency by means of the acousto-optic interaction effect, and specifically that the optical amplitude and frequency modulation is equal to the amplitude and frequency of the input electrical signal. Further, the undiffracted portion of the optical beam does not experience any acousto-optic modulation, and thus serves as a reference signal beam carrying the original amplitude and frequency parameters of the input laser beam. A remote photodetector in the reverse biased photo current mode serves as a classical signal mixer so that the incoming diffracted beams and the incoming undiffracted beam provide the signals required to perform homodyne mode detection and recovery of the original electrical signal. This architecture is useful for carrying electrical information in that the architecture provides a self-referencing signal modulation system, i.e., the desired electrical signal parameters are represented by the amplitude and frequency differences between the undiffracted reference beam and the diffracted signal beams present in the composite beam. This architecture of optical differences provides a means for signal transmission and recovery that is independent of absolute laser amplitude and frequency variations or instabilities. Further, the architecture provides a means of providing a coherent signal channel that provides a means of transmitting complex electrical signals over some useful distance to a remote photodetector receiver that can recover the complex electrical signal.

BRIEF DESCRIPTION OF THE SEVERAL VIEWS OF THE DRAWING(S)

Figure 2:
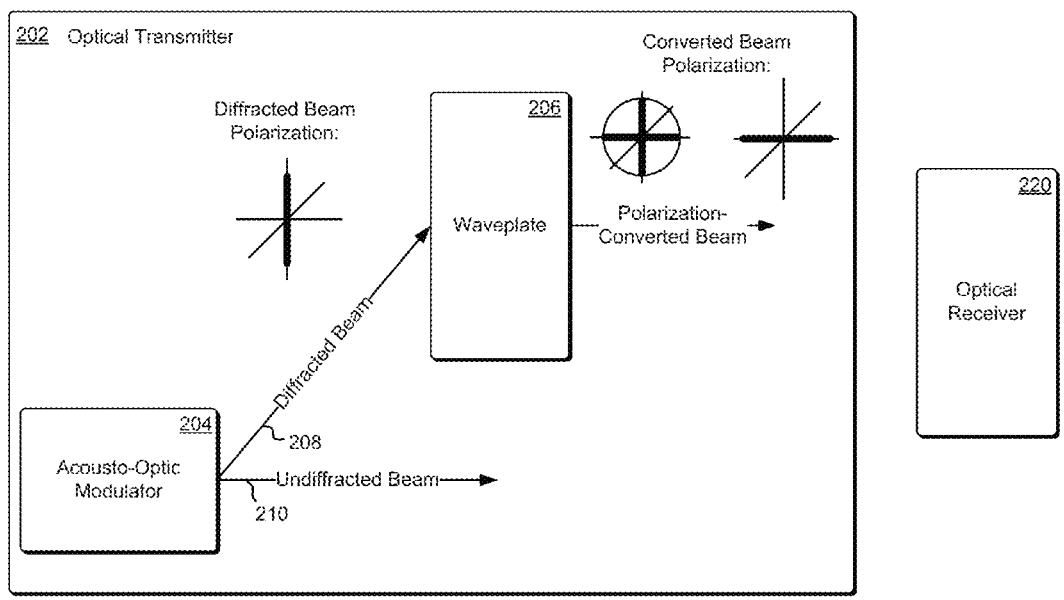

FIG. 1 shows an example of an acousto-optic communication system in accordance with at least one embodiment; and FIG. 2 shows an example of polarization conversion in accordance with at least one embodiment.

DETAILED DESCRIPTION OF THE INVENTION

FIG. 1 shows an example of an acousto-optic communication system in accordance with at least one embodiment. The acousto-optic communication system may be an optical transmitter that is configured to receive an input electrical signal and modulate the input electrical signal as an optical beam.

In the communication system a laser source 102 supplies one or more laser beams to laser beam forming optics 104. Following beam forming, an input laser beam is provided to an acousto-optic modulator 106, which is also known as a Bragg cell. In addition to the input laser beam, the acousto-optic modulator 106 also received an input electrical signal 108. The acousto-optic modulator 106 causes a portion of the input laser beam to become diffracted at an angle away from the incoming beam direction. For example, in FIG. 1 two output beams 112, 114 are shown. The first output beam 112 (also referred to herein as a zero-order beam or undiffracted beam) may have the same or corresponding amplitude, angle of arrival, incidence or diffraction or polarization properties as the input laser beam. The second output beam 114 (also referred to herein as a first-order beam or diffracted beam) may have different amplitude, angle of arrival, incidence or diffraction or polarization properties than the input laser beam. It is noted that only two output beams 112, 114 are shown in FIG. 1 for ease of description and that various embodiments may be contemplated in which there are fewer or more output beams.

The angle of diffraction of the diffracted beam 114 is proportional to the electrical frequency of the input electrical signal 108, which may be a data-modulated radio frequency (RF) signal input. Further, the amplitude of the diffracted beam 114 is also proportional to the amplitude of the input electrical signal. A plurality of simultaneous input electrical signals may cause the diffraction of a plurality of output beams. Each output beam of the plurality of output beams may have an angle of diffraction that is a function of the frequency of the input electrical signal 108. Further, the optical amplitudes of the output beams are proportional to the amplitudes of the input electrical signal. An input electrical signal 108 representing a wide bandwidth signal whose instantaneous signal bandwidth is a complex representation of multiple signal components may result in a broad diffracted beam diverging from the acousto-optic modulator 106 with a complex amplitude spectrum.

Following modulation by the acousto-optic modulator 106, the undiffracted beam 112 and one or more diffracted beams 114 may propagate to a remote photodetector that is configured to recover the electrical signal based on the received beams. The photodetector may utilize both the amplitudes and angles of diffraction of the diffracted beams 114 as well properties of the undiffracted beam 112 to recover the modulated input electrical signal 108.

In addition to the amplitude of the diffracted beam 114 being modulated in accordance with the amplitude of the input electrical signal, the polarization properties of the diffracted beam 114 may become different than the polarization properties of the undiffracted beam 112. Furthermore, recovery of the electrical signal by a remote photodetector based on the undiffracted beam 112 and one or more other diffracted beams (such as the diffracted beam 114) may be impacted by the polarization parameters of the input undiffracted and diffracted beam components. For better recovery of the electrical signal 108, it is desirable for the undiffracted beam 112 and the one or more diffracted beam 114 components to have the same or corresponding signal polarizations. For example, the ability to recover the electrical signal from the optical beams may be improved by minimizing the difference in polarization parameters of the two optical beams.

As described herein, much like the diffracted beams 114 experience modulation of amplitude and frequency by the input electrical signal 108, the diffracted beams 114 also experience modulation of the optical polarization electric field vector. The modulation of the optical polarization electric field vector will cause the polarization of the diffracted beams 114 to be different than the undiffracted beam 112.

As shown in FIG. 1 an optical waveplate 116 is used to correct an undesirable change in the optical beam electric field polarization of the diffracted beam 114. The optical waveplate 116 may be a passive optical component and may be used in the optical transmitter to counteract changes in the optical beam electric field polarization of the diffracted beam 114 induced by the acousto-optic modulator 106. Accordingly, the adverse effects of propagation through homogeneous media are reduced. The waveplate 116 may be disposed between the acousto-optic modulator 106 and a lens 118 that aligns the diffracted beams 114 and the undiffracted beam 112. Correction of the optical electric field polarization in the diffracted optical beam 114 is accomplished within the optical transmitter by inserting the waveplate 116 that converts the polarization parameter of the diffracted beams 114 to be compatible with the polarization parameter of the undiffracted beam 112.

It is noted that the composite beam comprising the diffracted signal beams 114 and the undiffracted reference beam 112 both experience similar or identical effects of the inhomogeneous media. However, because signal information is conveyed in the difference of optical parameters of the composite beam, the propagation effects of the media are reduced.

The waveplate 116 may be a quarter waveplate that performs bi-directional optical polarization conversion from linear polarization to circular polarization. Further, the waveplate 116 may be a halfwave plate that performs bi-directional optical polarization conversion from linear polarization to an orthogonal linear polarization (for example, by rotating the polarization by 90 degrees). Insertion of an appropriate wave plate accomplishes the correction of the polarization vector.

FIG. 2 shows an example of polarization conversion in accordance with at least one embodiment. An optical transmitter 202 is shown to include an acousto-optic modulator 204 and a waveplate 206. Also shown is an optical receiver 220, which may be responsible for receiving diffracted and undiffracted beams and recovering an electrical signal based at least in part on the received beams. The optical receiver 220 is also referred to herein as a photodetector. As described herein, the acousto-optic modulator 204 may receive a light beam, such as a laser beam, and modulate the laser beam in accordance with an electrical input signal to produce a diffracted beam 208. The acousto-optic modulator 204 also outputs an undiffracted beam 210 as shown in FIG. 2. The polarization properties of the diffracted beam 208 may have become altered due to the acousto-optic modulator 204 and it may be desirable for the polarization of the diffracted beam 208 to be transformed or converted to be the same as those of the undiffracted beam 210. For example, the undiffracted beam 210 may be circularly polarized and the diffracted beam 208 may be linearly polarized. Accordingly, the linear polarization of the diffracted beam 208 may be sought to be converted to circular polarization for the polarizations of the two beams 208, 210 to correspond to one another. Similarly the diffracted beam 208 may be linearly polarized and the polarization may be sought to be converted to an orthogonal linear polarization.

A waveplate 206 may be used to convert the polarization of the diffracted beam 208. As described herein, the waveplate 206 may be a quarter waveplate that is configured to convert a linearly polarized diffracted beam to become circularly polarized and vice-versa. Further, the waveplate 116 may be a halfwave plate that is configured to convert a linearly polarized diffracted beam to have an orthogonal linear polarization and vice-versa. In addition, polarization conversion may include changing diffracted signal polarization from or to elliptical polarization. Having a correspondence or a match between the polarization of the diffracted beam 208 and the undiffracted beam 210 results in improved detection and recovery of an electrical signal modulated by the acousto-optic modulator 204.

Although polarization conversion is described for use in optical transmitters, it may be contemplated in various embodiments that the conversion is performed by a receiving entity, such as an optical receiver that is responsible for recovering an electrical signal from transmitted optical beams. Furthermore, the embodiments described herein are not limited to light beams and may be applicable to any waveform, such as any electromagnetic waveform. It is also noted that even though polarization conversion is described herein as being applied to or performed on diffracted beams, in various embodiments the polarization of an undiffracted beam may be converted to correspond to the polarization of the diffracted beam. A correspondence in polarization between two beams may include the two beams having a matching polarization or a first polarization of a first beam being converted to approximate the second polarization of the second beam, among others. Two beams may have corresponding polarizations if the first polarization of the first beam is converted to be close (but not identical) to the second polarization of the second beam.

The foregoing described embodiment depicts different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While a particular embodiment of the present invention has been illustrated and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. An optical communication system comprising:
    an acousto-optic modulator configured to receive an electrical signal and modulate a light beam in accordance with the received electrical signal to produce an undiffracted beam and at least one diffracted beam, the undiffracted beam having a first polarization and the at least one diffracted beam having a second polarization, the first polarization and the second polarization being different; and
    a waveplate configured to receive the at least one diffracted beam as an input, convert the second polarization of the at least one diffracted beam to correspond to the first polarization and provide the at least one diffracted beam having the converted polarization.

2. The system of claim 1 wherein the acousto-optic modulator is further configured to receive the light beam from a laser source.

3. The system of claim 1, further comprising:
    at least one lens configured to receive the undiffracted beam and the at least one diffracted beam having the converted polarization and align the undiffracted beam and the at least one diffracted beam having the converted polarization for transmission to an optical receiver.

4. The system of claim 3 wherein the optical receiver is a photodetector.

5. The system of claim 1 wherein the first polarization of the undiffracted beam is linear, circular or orthogonal linear.

6. The system of claim 1 wherein the waveplate is further configured to convert the second polarization of the at least one diffracted beam from linear, circular or orthogonal linear to correspond to the first polarization of the undiffracted beam.

7. The system of claim 1 wherein an amplitude of the at least one diffracted beam is modulated in accordance with an amplitude of the received electrical signal.

8. The system of claim 1 wherein the acousto-optic modulator is a Bragg cell.

9. The system of claim 1 wherein the first polarization of the undiffracted beam is the same as a polarization of the light beam.

10. The system of claim 9 wherein modulating the light beam, by the acousto-optic modulator, in accordance with the received electrical signal causes the second polarization of the at least one diffracted beam to be different than the polarization of the light beam.

11. The system of claim 1 wherein an angle of diffraction of the diffracted beam is a function of a frequency of the received electrical signal.

12. An optical transmitter comprising:
    a laser source configured to provide a laser beam;
    a Bragg cell configured to modulate the laser beam in accordance with an electrical signal to produce an undiffracted beam and a diffracted beam, the undiffracted beam having a first polarization and the modulation causing the diffracted beam to have a second polarization that is different from the first polarization of the undiffracted beam; and
    a waveplate configured to receive the diffracted beam from the Bragg cell and convert the second polarization of the diffracted beam to correspond to the first polarization of the undiffracted beam, the waveplate being further configured to output diffracted beam having the converted polarization.

13. The optical transmitter of claim 12 wherein:
    the first polarization of the undiffracted beam is linear, circular or elliptical; and
    a polarization of the output diffracted beam matches the linear, circular or elliptical polarization of the undiffracted beam.

14. The optical transmitter of claim 12 wherein an amplitude of the diffracted beam is modulated to be a function of an amplitude of the electrical signal.

15. The optical transmitter of claim 12 wherein an angle of diffraction of the diffracted beam is a function of a frequency of the electrical signal.

16. The optical transmitter of claim 12, further comprising:
    at least one lens configured to receive, from the Bragg cell, the undiffracted beam and the diffracted beam and align the undiffracted beam and the diffracted beam for transmission to an optical receiver.

17. The optical transmitter of claim 16 wherein the optical receiver is a photodetector.

18. An optical communication system comprising:
    an acousto-optic modulator configured to receive a waveform and modulate the waveform in accordance with an electrical signal to produce an undiffracted beam and a diffracted beam, at least one of the undiffracted beam or the diffracted beam having a first polarization and at least one other of the undiffracted beam or the diffracted beam having a second polarization, the first polarization and the second polarization being different due to the modulation of the waveform;
    a waveplate configured to convert the second polarization to correspond to the first polarization.

19. The optical communication system of claim 18 wherein the waveplate is further configured to output the at least one other of the undiffracted beam or the diffracted beam having a polarization corresponding to the first polarization for transmission.

20. The optical communication system of claim 19, further comprising:
    composite beam launching optics configured to receive the at least one other of the undiffracted beam or the diffracted beam from the waveplate and transmit the at least one other of the undiffracted beam or the diffracted beam to an optical receiver.

* * * * *